(12) United States Patent
Baumberg

(10) Patent No.: US 7,079,680 B2
(45) Date of Patent: Jul. 18, 2006

(54) 3D COMPUTER MODEL PROCESSING APPARATUS

(75) Inventor: Adam Michael Baumberg, Berkshire (GB)

(73) Assignee: Canon Europa N.V., Amstelveen (NL)

( * ) Notice: Subject to any disclaimer, the term of this patent is extended or adjusted under 35 U.S.C. 154(b) by 730 days.

(21) Appl. No.: 10/255,178

(22) Filed: Sep. 26, 2002

(65) Prior Publication Data

US 2003/0063086 A1    Apr. 3, 2003

(30) Foreign Application Priority Data

Sep. 28, 2001    (GB)    .................................... 0123385

(51) Int. Cl.
    *G06K 9/00*    (2006.01)
(52) U.S. Cl. ...................................... 382/154; 345/420
(58) Field of Classification Search ................. 382/154
    See application file for complete search history.

(56) References Cited

U.S. PATENT DOCUMENTS

| | | | | |
|---|---|---|---|---|
| 5,706,419 A * | 1/1998 | Matsugu et al. | ............. | 345/420 |
| 5,917,937 A * | 6/1999 | Szeliski et al. | ............. | 382/154 |
| 2001/0056308 A1 | 12/2001 | Petrov et al. | ................. | 700/98 |
| 2002/0050988 A1* | 5/2002 | Petrov et al. | ................ | 345/418 |
| 2002/0164066 A1* | 11/2002 | Matsumoto | ................. | 382/154 |
| 2003/0085891 A1* | 5/2003 | Lyons et al. | ................ | 345/420 |

FOREIGN PATENT DOCUMENTS

| | | |
|---|---|---|
| EP | 0 898 245 A1 | 2/1999 |
| GB | 2 358 307 A | 7/2001 |
| WO | WO 99/55233 | 4/1999 |
| WO | WO 01/39124 A2 | 5/2001 |

OTHER PUBLICATIONS

Baumberg; "Blending images for texturing 3D models", BMVC 2002.*

(Continued)

*Primary Examiner*—Joseph Mancuso
*Assistant Examiner*—Jordan Kuhn
(74) *Attorney, Agent, or Firm*—Fitzpatrick, Cella, Harper & Scinto

(57) ABSTRACT

In a computer processing apparatus 2, a 3D computer model comprising a polygon mesh 500 representing the visual hull of an object 300 is generated by processing images of the object recorded at different positions and orientations to back-project the silhouette of the object in each image to give a respective cone which constrains the volume of 3D space occupied by the object. To remove concave and convex artefacts 510 in the polygon mesh 500, the polygon mesh is projected into each image to give a respective reference silhouette for each image. A change is made to at least one edge or vertex in the polygon mesh to give a refined polygon mesh, which is then projected into each image. The resulting silhouette in each image is tested against the corresponding reference silhouette. If the silhouette of the refined polygon mesh is the same as each reference silhouette, to within an allowable tolerance, then the changed edge or vertex is allowed in the polygon mesh, otherwise the polygon mesh is returned to its previous state. This processing to change and test the polygon mesh is carried out a number of times. Artefacts are removed from the polygon mesh because their removal does not make the polygon mesh inconsistent with the reference silhouettes. Parts of the polygon mesh representing actual features of the object are not changed because such a change causes the polygon mesh to become inconsistent with at least one reference silhouette and therefore such a change is rejected.

31 Claims, 10 Drawing Sheets

OTHER PUBLICATIONS

Eckert et al.; "Shape Refinement for Reconstructing 3D-Objects using an analysis-synthesis approach", 2001 International Conference on Image Processing, Oct. 7-10, 2001.*

Boyer et al.; "A Hybrid Approach for Computing Visual Hulls of Complex Objects", Proceedings of the 2003 IEEE Computer Society Conference on Computer Vision and Pattern Recognition, 2003.*

Laurentini; "Inferring the Shape of the Real Object from the Object Reconstrcuted by Volume Intersection", IEEE, 1993.*

M. Szilvasi-Nagy, "An Algorithm for Determining the Intersection of Two Simple Polyhedra", Computer Graphics Forum 3, 1984, pp. 219-225.

S. Melax, "A Simple, Fast, and Effective Polygon Reduction Algorithm", Game Developer, 1998, pp. 44-49.

W. Niem, "Automatic reconstruction of 3D objects using a mobile camera", Vision Computing 17, 1999, pp. 125-134.

M. Löhlein, "A Volumetric Intersection Algroithm for 3d-Reconstruction Using a Boundary-Representation", pp. 1 of 10.

W. K. Pratt, "Digital Image Processing" Second Edition, ISBN 0-471-85766-1, p. 457.

R. I. Hartley, "Euclidean Reconstruction from Uncalibrated Views", 1993, pp. 237-256.

M. Desburn et al., "Implicit Fairing of Irregular Meshes using Diffusion and Curvature Flow", SIGGRAPH 99, pp. 317-324.

J. Illingworth et al., "Looking to build a model world: automatic construction of static object models using computer vision", Electronics & Communication Engineering Journal, Jun. 1998, pp. 103-113.

W. E. Lorensen et al., "Marching Cubes: A High Resolution 3D Surface Construction Algorithm", Computer Graphics, vol. 21, No. 4, Jul. 1987, pp. 163-169.

H. Hoppe, "Progressive Meshes", Proceedings SIGGRAPH 96, pp. 99-108.

* cited by examiner

3D COMPUTER MODEL PROCESSING APPARATUS

BACKGROUND OF THE INVENTION

1. Field of the Invention

The present invention relates to computer processing of data defining a three-dimensional (3D) computer model of an object.

2. Related Background Art

Many methods are known for generating a 3D computer model of an object.

The known methods include "shape-from-silhouette" methods, which generate a 3D computer model by processing images of an object recorded at known positions and orientations to back project the silhouette of the object in each image to give a respective endless cone containing the object and having its appex at the position of the focal point of the camera when the image was recorded. Each cone therefore constrains the volume of 3D space occupied by the object, and the intersection of the cones, which approximates the object and is known as the "visual hull" of the object, is calculated.

Examples of shape-from-silhouette methods are described, for example, in "Looking to build a model world: automatic construction of static object models using computer vision" by Illingworth and Hilton in Electronics and Communication Engineering Journal, June 1998, pages 103–113, and "Automatic reconstruction of 3D objects using a mobile camera" by Niem in Image and Vision Computing 17 (1999) pages 125–134. The methods described in both of these papers calculate the intersections of the silhouette cones to generate a "volume representation" of the object made up of a plurality of voxels (cuboids). More particularly, 3D space is divided into voxels, and the voxels are tested to determine which ones lie inside the volume defined by the intersection of the silhouette cones. Voxels inside the intersection volume are retained to define a volume of voxels representing the object. The volume representation is then converted to a surface model comprising a plurality of polygons for rendering.

"A Volumetric Intersection Algorithm for 3d-Reconstruction Using a Boundary-Representation" by Martin Löhlein at http://i31www.ira.uka.de/diplomarbeiten/da_martin_loehlein/Reconstruction.html discloses a shape-from-silhouette method of generating a 3D computer model which does not result in a voxel representation. Instead, the intersections of the silhouette cones from a plurality of images are calculated directly. More particularly, the method starts with a cube containing the object, and intersects it with the first silhouette cone to give a first approximation of the object. This approximation is then intersected with the next cone to give a second approximation, and so on for each respective silhouette cone. To intersect a silhouette cone with an approximation, the cone and the approximation are projected into the image from which the cone was taken. This reduces the cone to the 2d-polygon (silhouette) from which it was made and reduces the approximation from 3d-polygons to 2d-polygons. The cone polygon is then intersected with all the approximation's polygons using a conventional algorithm for 2d-polygon intersection.

The inventor of the present invention has realised that a visual hull computer model of an object often suffers from the problem that artefacts comprising concavities and convexities appear in the computer world which do not exist on the object in real-life.

In particular, the inventor has identified two types of convex and concave artefacts which decrease the accuracy of the 3D computer model of an object and which are a particular problem. These are convex artefacts on top of planar surfaces forming a "dome" on the planar surface, and convex and concave artefacts in high curvature surface regions forming "creases" and "folds" in the surface that are not present on the object.

The present invention has been made with these problems in mind.

SUMMARY OF THE INVENTION

According to the present invention, there is provided a computer processing method and apparatus for processing data defining a polygon mesh representing the visual hull of an object, to remove artefacts in the computer model. At least one polygon in the mesh is changed, and the resulting change to the polygon mesh is tested against a reference silhouette in each image to determine whether it is consistent to within a predetermined tolerance with all of the reference silhouettes. A change which is consistent with all of the reference silhouettes is allowed in the computer model (or a corresponding change producing the same effect is allowed), but a change which is inconsistent with at least one reference silhouette is rejected. The process of making a change and testing it against the reference silhouettes is repeated a number of times.

In this way, artefacts are removed because their removal does note make the polygon mesh inconsistent with the reference silhouettes. On the other hand, parts of the polygon mesh representing features actually present on the object are not changed because such a change causes the polygon mesh to become inconsistent with at least one reference silhouette, and therefore such a change is rejected.

Preferably, the reference silhouettes are generated by projection of the polygon mesh into each images before any changes are made to the polygon mesh.

The present invention also provides a computer program product, embodied for example as a storage device carrying instructions or a signal carrying instructions, comprising instructions for causing a programmable processing apparatus to become operable to perform a method as set out above or to become configured as an apparatus as set out above.

BRIEF DESCRIPTION OF THE DRAWINGS

Embodiments of the invention will now be described, by way of example only, with reference to the accompanying drawings, in which:

FIG. 5, comprising

FIG. 7, comprising FIG. 8, comprising

DETAILED DESCRIPTION

First Embodiment

Figure 1:
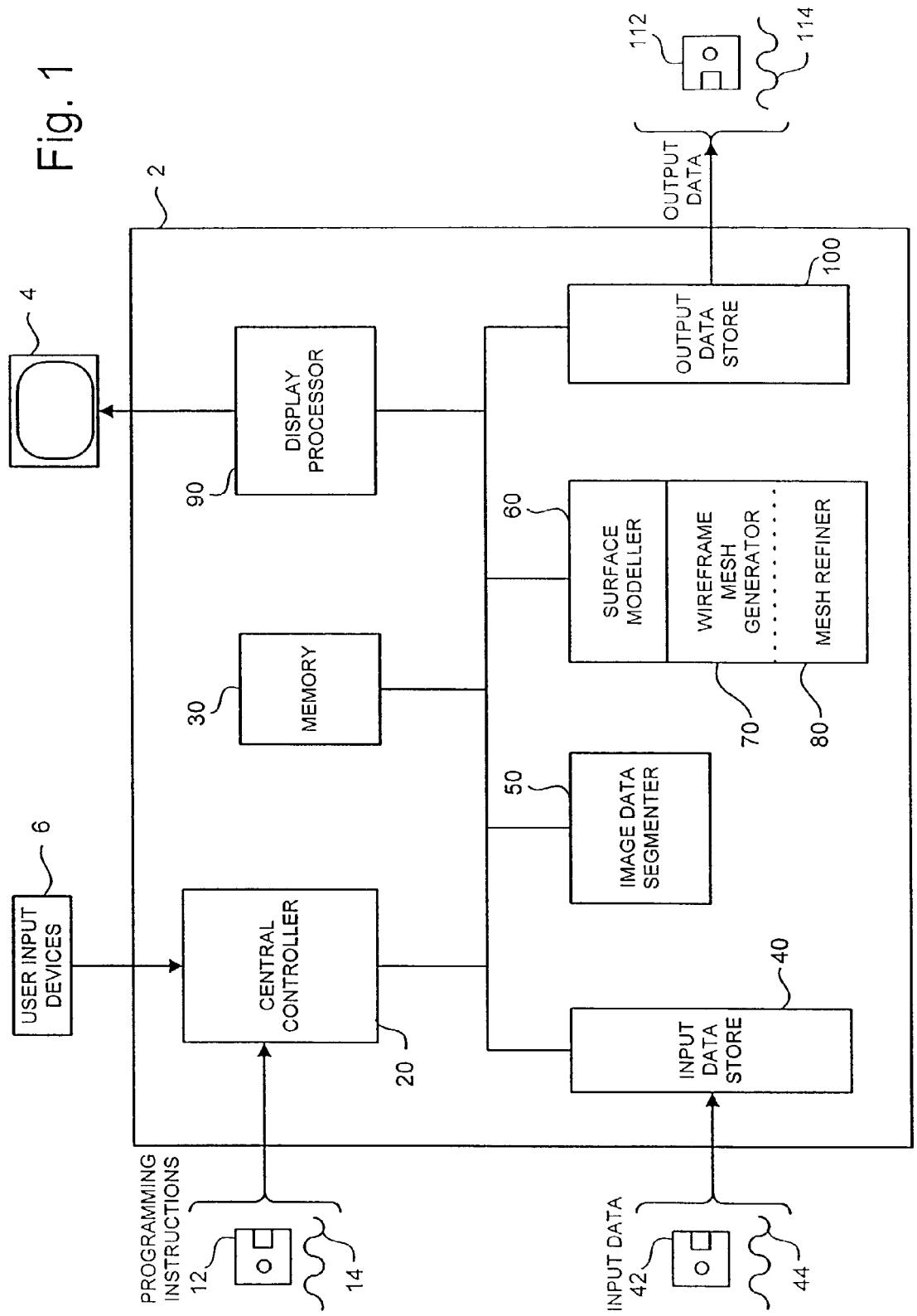
FIG. 1 schematically shows the components of a first embodiment of the invention, together with the notional functional processing units into which the processing apparatus component may be thought of as being configured when programmed by programming instructions.

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, and user input devices 6, such as a keyboard, mouse etc.

The processing apparatus 2 is programmed to operate in accordance with programming instructions input, for example, as data stored on a data storage medium, such as disk 12, and/or as a signal 14 input to the processing apparatus 2, for example from a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to process input data defining a plurality of images of a subject object recorded at different positions and orientations and data defining the positions and orientations at which the input images were recorded, to generate data defining a three-dimensional computer model of the subject object and subsequently to refine the model to remove artefacts. The computer model is calculated by back-projecting the silhouette of the subject object in each input image to define a polyhedron for each silhouette which constrains the volume of 3D space occupied by the subject object. The volume of 3D space defined by the intersection of the polyhedra is calculated. This defines the largest object in volume, which, when imaged, could generate the input images, and is referred to as the visual hull of the subject object. The refinement processing is carried out to remove concavities and convexities which the inventor has found are often present as artefacts in the model because the model is a visual hull model.

When programmed by the programming instructions, processing apparatus 2 can be thought of as being configured as a number of functional units for performing processing operations. Examples of such functional units and their interconnections are shown in FIG. 1. The units and interconnections illustrated in FIG. 1 are, however, notional, and are shown for illustration purposes only to assist understanding; they do not necessarily represent units and connections into which the processor, memory etc of the processing apparatus 2 actually become configured.

Referring to the functional units shown in FIG. 1, a central controller 20 is arranged to process inputs from the user input devices 6, and also to provide control and processing for the other functional units. Memory 30 is provided for use by central controller 20 and the other functional units.

Input data store 40 is arranged to store input data input to the processing apparatus 2 for example as data stored on a storage device, such as disk 42, as a signal 44 transmitted to the processing apparatus 2, or using a user input device 6. The input data defines a plurality of images of a subject object recorded at different positions and orientations, and data defining the relative positions and orientations at which the images were recorded. In addition, in this embodiment, the input data also includes data defining the intrinsic parameters of the camera which recorded the images, that is, the aspect ratio, focal length, principal point (the point at which the optical axis intersects the imaging plane), first order radial distortion coefficient, and skew angle (the angle between the axes of the pixel grid; because the axes may not be exactly orthogonal).

The input data defining the input images may be generated for example by downloading pixel data from a digital camera which recorded the images, or by scanning photographs using a scanner (not shown).

The input data defining the positions and orientations at which the images were recorded may be generated in any of a number of different images. For example, the images may be processed as described in EP-A-0898245 or WO-A-01/39124 to calculate the relative positions and orientations based on matching features in the images, or the input images may be generated using a plurality of cameras surrounding the subject object with each camera having a known, fixed position and orientation which is input to the processing apparatus 2. Alternatively, a fixed camera may be used to image the subject object mounted on a turntable having position encoders which output the precise rotation of the turntable. Knowing the fixed position of the camera and the turntable angle, the relative position and orientation of each image of the subject object can be calculated.

The input data defining the intrinsic camera parameters may be input by a user using a user input device 6.

Image data segmenter 50 is arranged to process each input image to segment image data corresponding to the subject object from other image data in the image.

Surface modeller 60 is arranged to process the segmented image data produced by image data segmenter 50 and the input data defining the positions and orientations at which the images were recorded and the imaging parameters, to generate data defining a 3D computer model representing the actual surfaces of the subject object in the input images.

Surface modeller 80 comprises a wireframe mesh generator 70 and a mesh refiner 80.

Wireframe mesh generator 70 is arranged to process the input data to back-project the silhouette of the subject object in each input image to form a respective polyhedron in 3D space for each silhouette, and to generate a polygon mesh defining the volume of 3D space constrained by the polyhedra—that is, the visual hull of the subject object.

Mesh refiner 80 is arranged to process the polygon mesh generated by the wireframe mesh generator 70 to remove convex and concave artefacts, thereby improving the accuracy of the 3D computer model.

Display processor 90, under the control of central controller 20, is arranged to display images and instructions to a user via display device 4 during processing to generate the 3D computer model. In addition, under the control of central controller 20, display processor 90 is also arranged to display images of the 3D computer model of the object from a user-selected viewpoint by rendering the surface model data generated by surface modeller 60.

Output data store 100 is arranged to store the data defining the surface model generated by surface modeller 60. Central controller 20 is arranged to control the output of data from output data store 100, for example as data on a storage device, such as disk 112, and/or as a signal 114. A recording of the surface model generated by surface modeller 60 may be made by recording the output signal 114 either directly or indirectly using recording apparatus (not shown).

Figure 2:
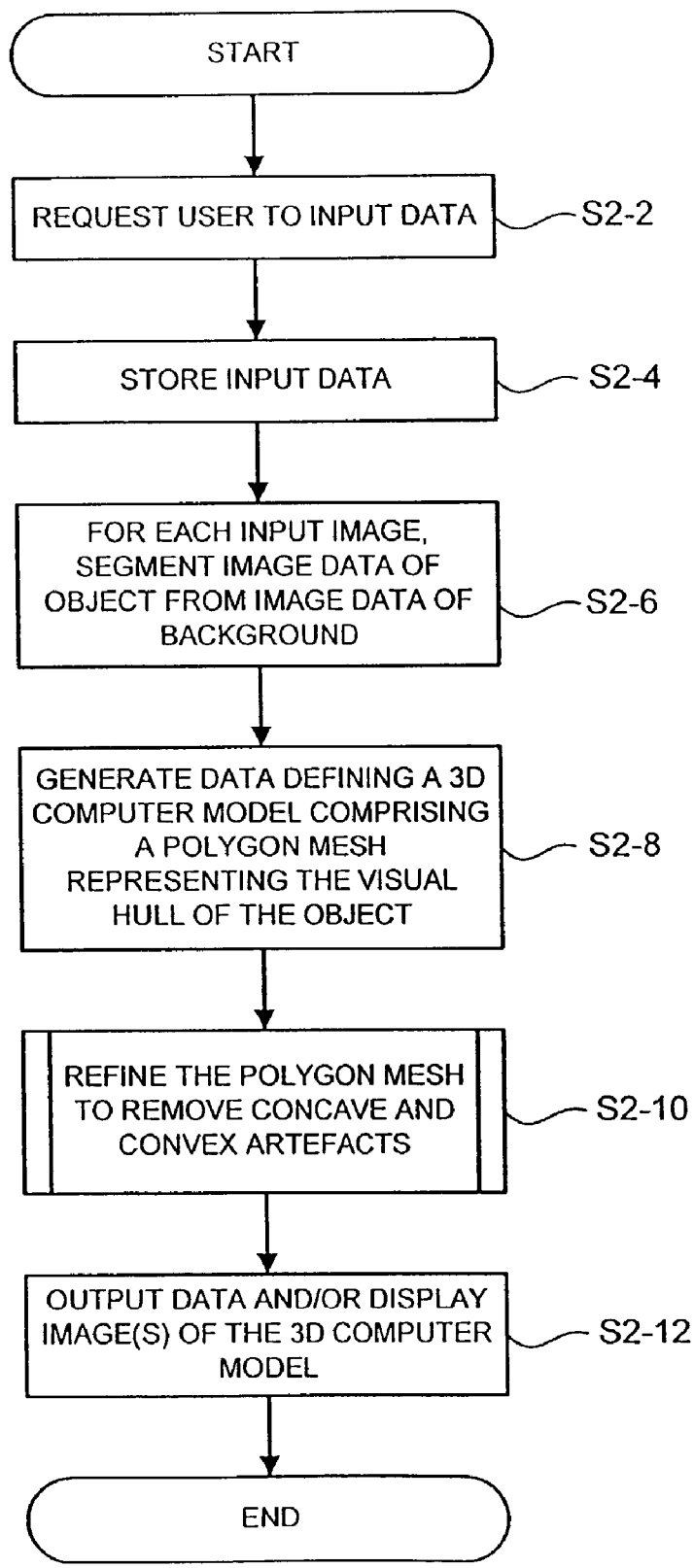
FIG. 2 shows the processing operations performed by the processing apparatus in FIG. 1 to process input data.

FIG. 2 shows the processing operations performed by processing apparatus 2 to process input data in this embodiment.

Referring to FIG. 2, at step S2-2, central controller 20 causes display processor 90 to display a message on display device 4 requesting the user to input data for processing.

At step S2-4, data input by the user in response to the request at step S2-2 is stored in the input data store 40. More particularly, in this embodiment, the input data comprises image data defining images of at least one subject object recorded at different relative positions and orientations, data defining the relative positions and orientations at which the input images were recorded, and data defining the intrinsic parameters of the camera which recorded the input images, that is the aspect ratio, focal length, principal point (the point at which the optical axis intersects the imaging plane), the first order radial distortion coefficient, and the skew angle (the angle between the axes of the pixel grid).

Figure 3:
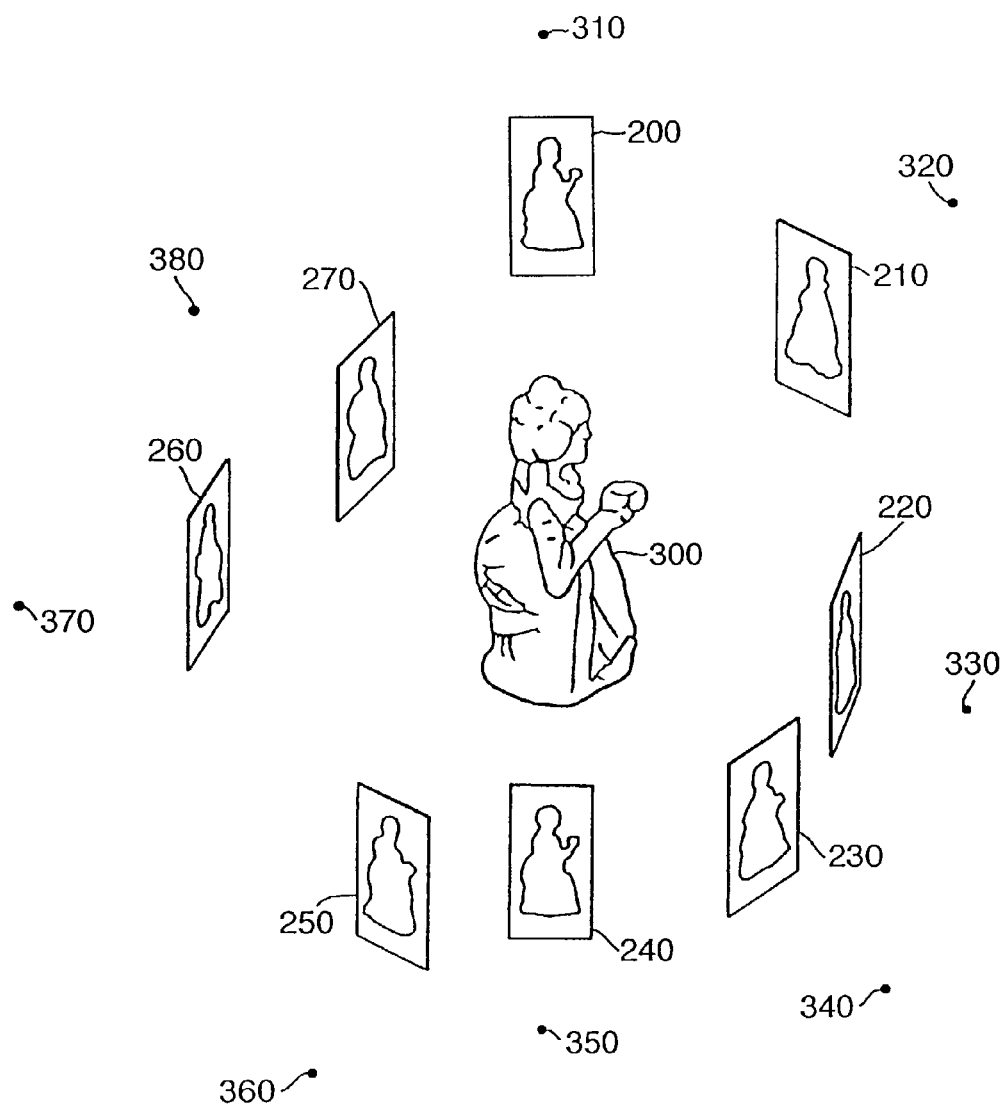
FIG. 3 shows an example to illustrate images and their recording positions and orientations defined in the input data stored at step S2-2 in FIG. 2.

Thus, referring to FIG. 3, at this stage in the processing, processing apparatus 2 has data stored therein defining a plurality of images 200–270 of a subject object 300, data defining the relative positions and orientations of the images 200–270 in 3D space, and data defining the imaging parameters of the images 200–270, which defines, inter alia, the focal point positions 310–380 of the images.

Referring again to FIG. 2, at step S2-6, image data segmenter 50 processes each input image stored at step S2-4 to segment image data representing the subject object form other image data (background image data). This processing is performed using a conventional image segmentation method, for example as described in part 2.2 of Annex A of GB-A-2358307.

Figure 4:
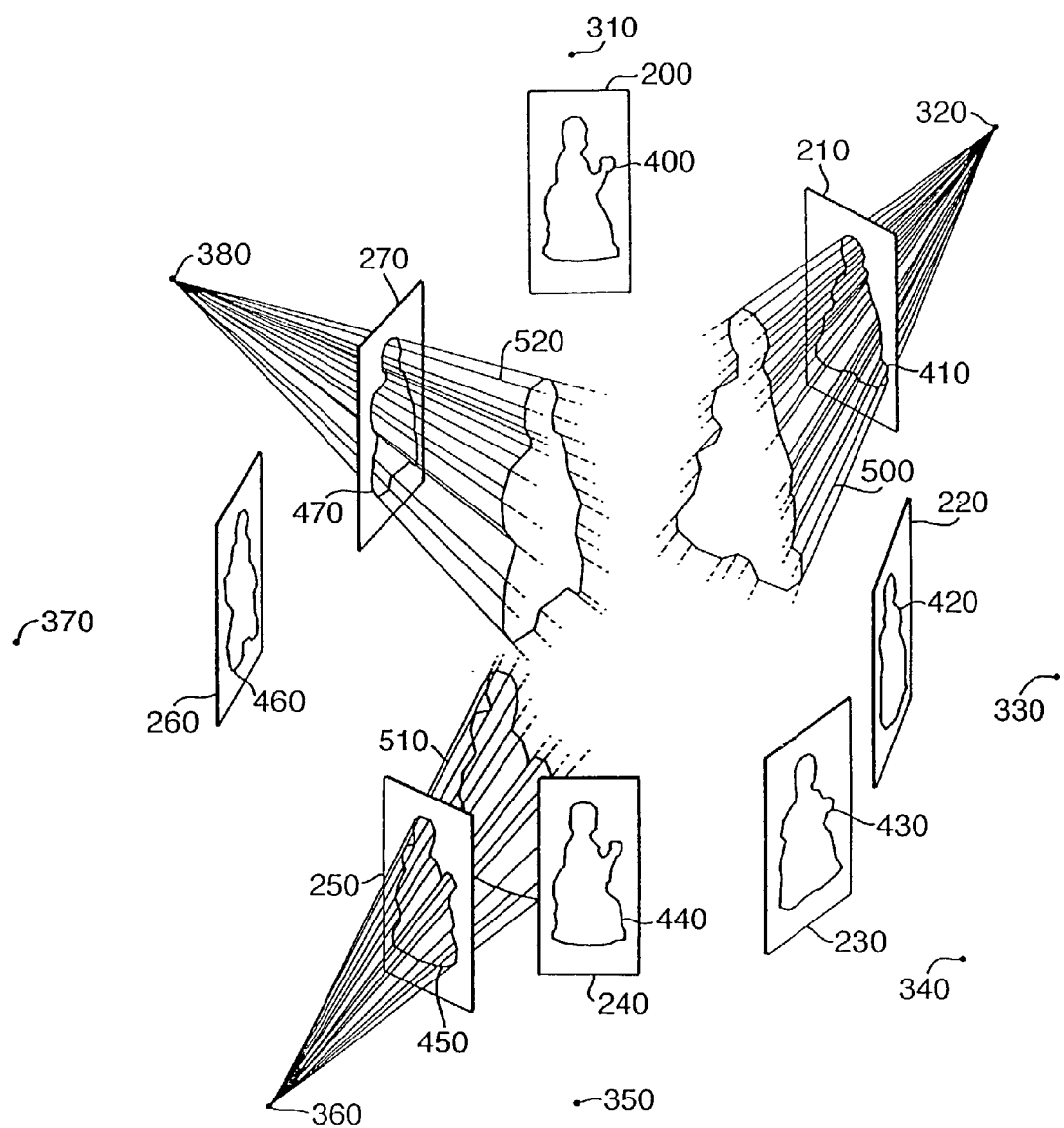
FIG. 4 shows an example of polyhedra defined from object silhouettes in the images from FIG. 3, and illustrates the processing performed at step S2-8 in FIG. 2 to calculate the intersections of the polyhedra to generate a 3D computer model of the subject object.

Referring to FIG. 4, at this stage in the processing, therefore, the silhouette 400–470 of the subject object 300 in each input image has been calculated, and the relative position and orientation of each silhouette in 3D space is known from the input data (because each silhouette 400–470 lies in the two-dimensional plane of an input image). In addition, the position of the focal point 310–380 for each input image is also known from the input data.

At step S2-8, wireframe mesh generator 70 processes the data generated by image data segmenter 50 defining the silhouettes 400–470 of the subject object 300 together with the input data stored at step S2-4 to generate data defining a mesh of connected polygons representing the visual hull of the subject object 300.

More particularly, referring to FIG. 4, each silhouette 400–470 defines, together with the focal point position 310–380 of the camera when the image in which the silhouette is situated was recorded, an infinite cone in three-dimensional space which touches the surface of the subject object 300 at (as yet unknown) points in the three-dimensional space (because the silhouette defines the outline of the subject object surface in the image). This is illustrated in FIG. 4 for silhouettes 410, 450 and 470, which, together with the focal point positions 320, 360 and 380 define respective infinite cones 500, 510 and 520 each having the same cross-sectional shape as the corresponding silhouette.

Wireframe mesh generator 70 performs processing at step S2-8 to determine the volume of 3D space defined by the intersection of the infinite cones defined by all of the silhouettes 400–470, and to represent the intersection volume by a mesh of connected planar polygons.

In this embodiment, this processing may be carried out using the technique described in the proprietor's co-pending U.S. patent application Ser. No. 10/164435 (the full contents of which are incorporated herein by cross-reference), or may be carried out using a conventional method, for example such as that described in "A Volumetric Intersection Algorithm for 3D-Reconstruction Using a Boundary-Representation" by Martin Löhlein at http://i31www.ira.uka.de/diplomarbeiten/da_martin_loehlein/Reconstruction.html or as described in "An Algorithm for Determining the Intersection of Two Simple Polyhedra" by M. Szilvasi-Nagy in Computer Graphics Forum 3 (1984) pages 219–225.

Alternatively, wireframe mesh generator 70 may perform shape-from-silhouette processing for example as described in "Looking to build a model world: automatic construction of static object models using computer vision" by Illingsworth and Hilton in Electronics and Communication Engineering Journal, June 1998, pages 103–113, or "Automatic reconstruction of 3D objects using a mobile camera" by Niem in Image and Vision Computing 17 (1999) pages 125–134. In these methods the intersections of the silhouette cones are calculated and used to generate a "volume representation" of the subject object made up of a plurality of voxels (cuboids). More particularly, 3D space is divided into voxels, and the voxels are tested to determine which ones lie inside the volume defined by the intersection of the silhouette cones. Voxels inside the intersection volume are retained to define a volume of voxels representing the object. The volume representation is then converted into a surface model comprising a mesh of connected polygons.

Figure 5A:
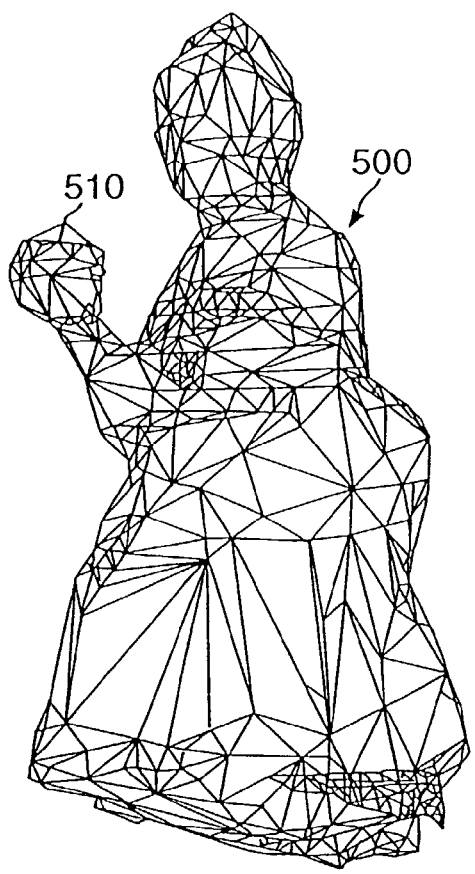
FIGS. 5a and 5b, shows an example of a polygon mesh generated as a result of the processing at step S2-8 in FIG. 2 and an example of a convex artefact in the polygon mesh.

Referring to FIG. 5a, the result of the processing performed by wireframe mesh generator 70 is data defining a 3D computer model comprising a polygon mesh 500 representing the visual hull of the subject object 300. In this embodiment, each polygon in the mesh 500 is a triangle, and comprises three edges and three vertices in a conventional manner.

Figure 5B:
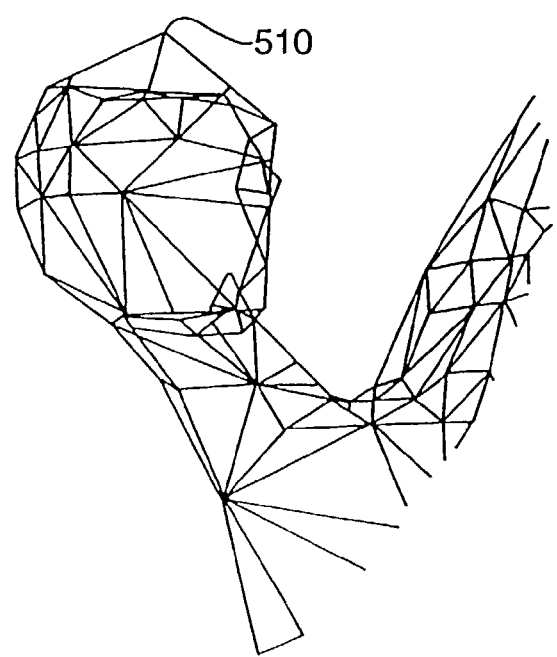

The inventor in the present case has realised that one problem which often occurs with a visual hull polygon mesh is that convexities and concavities appear in the computer model which do not exist on the subject object 300 itself. More particularly, the inventor has identified two types of convex and concave artefacts which are a particular problem because they decrease the accuracy of the polygon mesh representing subject object 300. These are convex artefacts on top of planar surfaces forming a "dome" on the planar surface, and convex and concave artefacts in high curvature regions forming "creases" and "folds" in the surface that are not present on the subject object 300. An example of the first type of artefact is illustrated in FIGS. 5a and 5b, which show a convex projection 510 which appears in the polygon mesh on a surface which is actually flat in the subject object 300 (the flat top surface of a cup). These artefacts occur because the polygon mesh is generated from only a limited number of silhouettes 410–470 which intersect to constrain the volume of 3D space occupied by the subject object 300, and because the 3D computer model represents the largest object in volume that could generate the input image data.

Accordingly, referring again to FIG. 2, at step S2-10, mesh refiner 80 performs processing to refine the polygon mesh 500 generated by wireframe mesh generator 70, to remove the concave and convex artefacts in the mesh.

Figure 6:
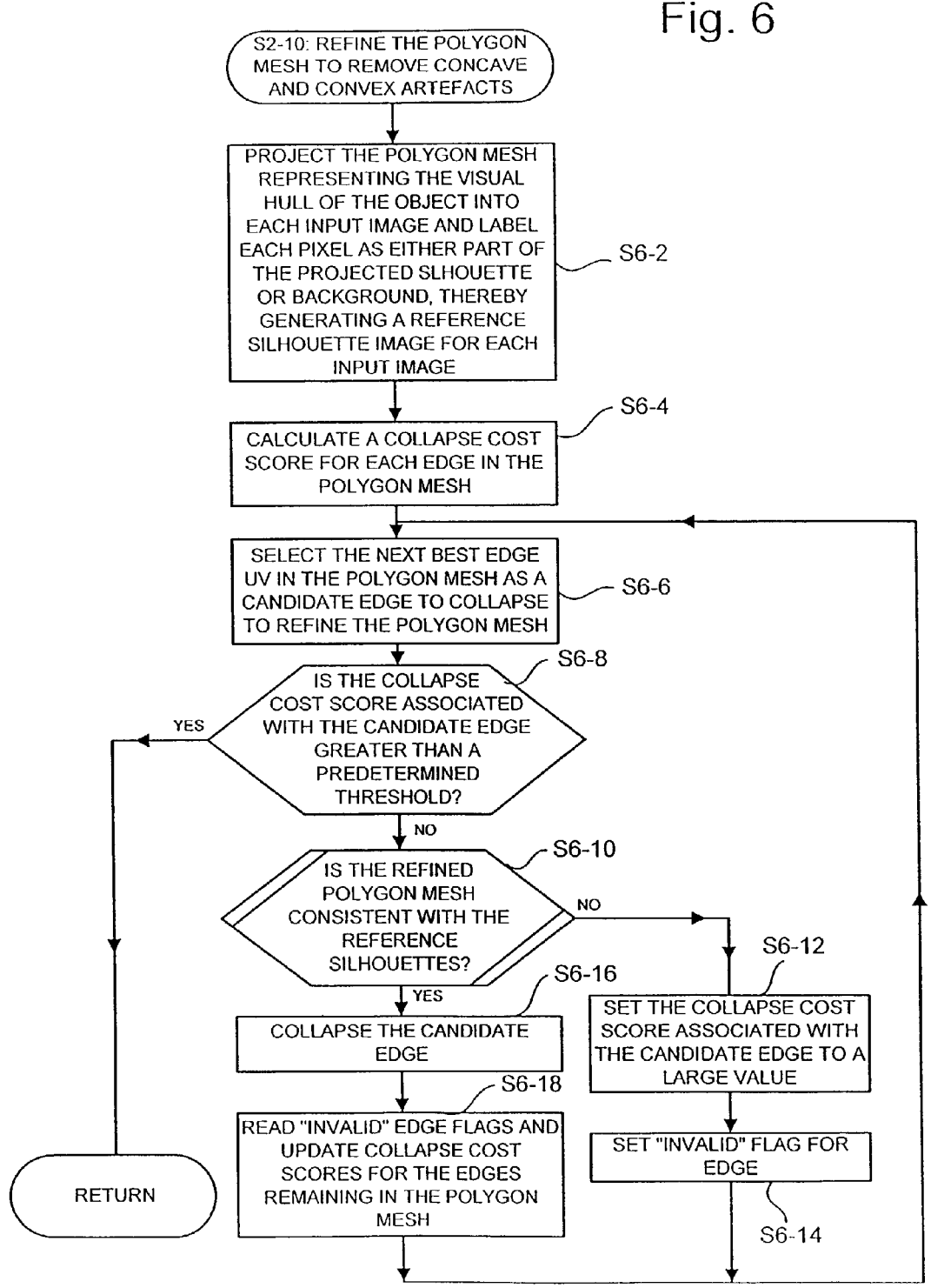
FIG. 6 shows the processing operations performed at step S2-10 in the first embodiment to refine the polygon mesh to remove artefacts.

FIG. 6 shows the processing operations performed by mesh refiner 80 at step S2-10.

Referring to FIG. 6, at step S6-2, mesh refiner 80 projects the polygon mesh 500 generated by wireframe mesh generator 70 into each respective input image 200–270.

In addition, in each input image 200–270, mesh refiner 80 sets the value of each pixel to either 0 or 1 to indicate whether or not the pixel is part of the projected polygon mesh (the value 1 indicating in this embodiment that the pixel is part of the projected mesh). In this way, a binary reference silhouette image is generated for each input image 200–270.

It should be noted that the pixel values defining the scene in the input images 200–270 stored at step S2-4 are of no relevance to the processing at step S6-2 since the purpose of this processing is to generate a binary reference silhouette image. Accordingly, the input pixel values stored at step S2-4 can be discarded before step S6-2 is performed (by setting all of the pixels to 0 or 1 in each input image).

At steps S6-4 to S6-18, mesh refiner 80 performs processing to test edges of polygons in the polygon mesh 500 to determine whether the edges can be removed from the polygon mesh without compromising the consistency of the 3D computer model with the reference silhouettes generated at step S6-2. More particularly, as will be explained below, mesh refiner 80 tests whether a polygon edge can be removed by temporarily removing the edge to give an amended polygon mesh, projecting the amended polygon mesh into each input image to give projected silhouettes, and testing the resulting projected silhouettes against the reference silhouettes generated at step S6-2. If, for any image, the difference between a projected silhouette and the corresponding reference silhouette is greater than a predetermined threshold, then the polygon edge is retained in the polygon mesh (because the polygon mesh without it would be inconsistent with the silhouette data), otherwise the edge is permanently removed from the polygon mesh.

In this way, edges which have no effect on the accuracy of the 3D computer model are removed, resulting in a "simplified" polygon model (that is, one which contains fewer edges than the original model) that is consistent with the silhouette data. Consequently, this results in convex and concave artefacts being removed because, when the polygon edges defining these artefacts are removed, it is found in the subsequent tests that the resulting polygon mesh is still consistent with the reference silhouettes.

The processing operations performed by mesh refiner 80 at steps S6-4 to S6-16 will now be described in detail.

At step S6-4, mesh refiner 80 calculates a collapse cost score for each edge in the polygon mesh 500. In this embodiment, this is carried out in accordance with a conventional edge decimation algorithm, for example as described in the article "A Simple Fast and Effective Polygon Reduction Algorithm" published at pages 44–49 of the November 1998 issue of Game Developer Magazine (publisher CMP Media, Inc) or as described in "Progressive Meshes" by Hoppe, Proceedings SIGGRAPH 96, pages 99–108.

More particularly, in accordance with the decimation algorithm, a collapse cost score is calculated for each edge in the polygon mesh 500 defining a measure of the effect that the edge's removal will have on the overall polygon mesh—the higher the score, the greater the effect the removal of the edge will have on the polygon mesh 500. This collapse cost score is calculated for each edge at step S6-4 in a conventional way, based on the edge's length and the flatness of the surface around the edge, and is independent of whether the polygon mesh without the edge is consistent with the reference silhouettes generated at step S6-2 (this consistency being tested in subsequent processing in this embodiment).

At step S6-6, mesh refiner 80 selects the next "best" edge UV in the polygon mesh as a candidate edge to collapse (this being the first "best" edge the first time step S6-6 is performed). More particularly, mesh refiner 80 selects the edge having the lowest calculated collapse cost score as a candidate edge to collapse (since the removal of this edge should have the least effect on the polygon mesh).

At step S6-8, mesh refiner 80 determines whether the collapse cost score associated with the candidate edge selected at step S6-6 is greater than a predetermined threshold value. On the first iteration of step S6-8, the collapse cost score associated with the candidate edge will be less than the predetermined threshold value. However, as will be explained below, when it is determined in subsequent processing that an edge should not be removed from the polygon mesh (because the resulting polygon mesh is inconsistent with one or more of the reference silhouettes generated at step S6-2) mesh refiner 80 sets the collapse cost score associated with the edge to a large predetermined value. The threshold value used in the test at step S6-8 is set to be below the collapse cost score set for an edge which is inconsistent with the reference silhouettes and therefore should not be removed from the polygon mesh. Accordingly, when it is determined at step S6-8 on subsequent iterations that the collapse cost score associated with the candidate edge is greater than the predetermined threshold, the processing has reached a stage where all edges which can be removed from the polygon mesh leaving the polygon mesh consistent with the reference silhouettes have already been removed, and no further edges can be removed. This is because the edge selected at step S6-6 as the candidate edge is the edge with the lowest collapse cost score, and accordingly if the collapse cost score is determined to be greater than the predetermined threshold at step S6-8, then the collapse cost score associated with all remaining edges will be greater than the predetermined threshold. In this case, the refinement of the 3D computer model is complete, and processing returns to step S2-12 in FIG. 2.

On the other hand, when it is determined at step S6-8 that the collapse cost score associated with the candidate edge is not greater than the predetermined threshold, processing proceeds to step S6-10, at which mesh refiner 80 determines whether the refined polygon mesh resulting from collapsing the candidate edge is still consistent with the reference silhouettes in the input images (these being the reference silhouettes generated at step S6-2).

Figure 7A:
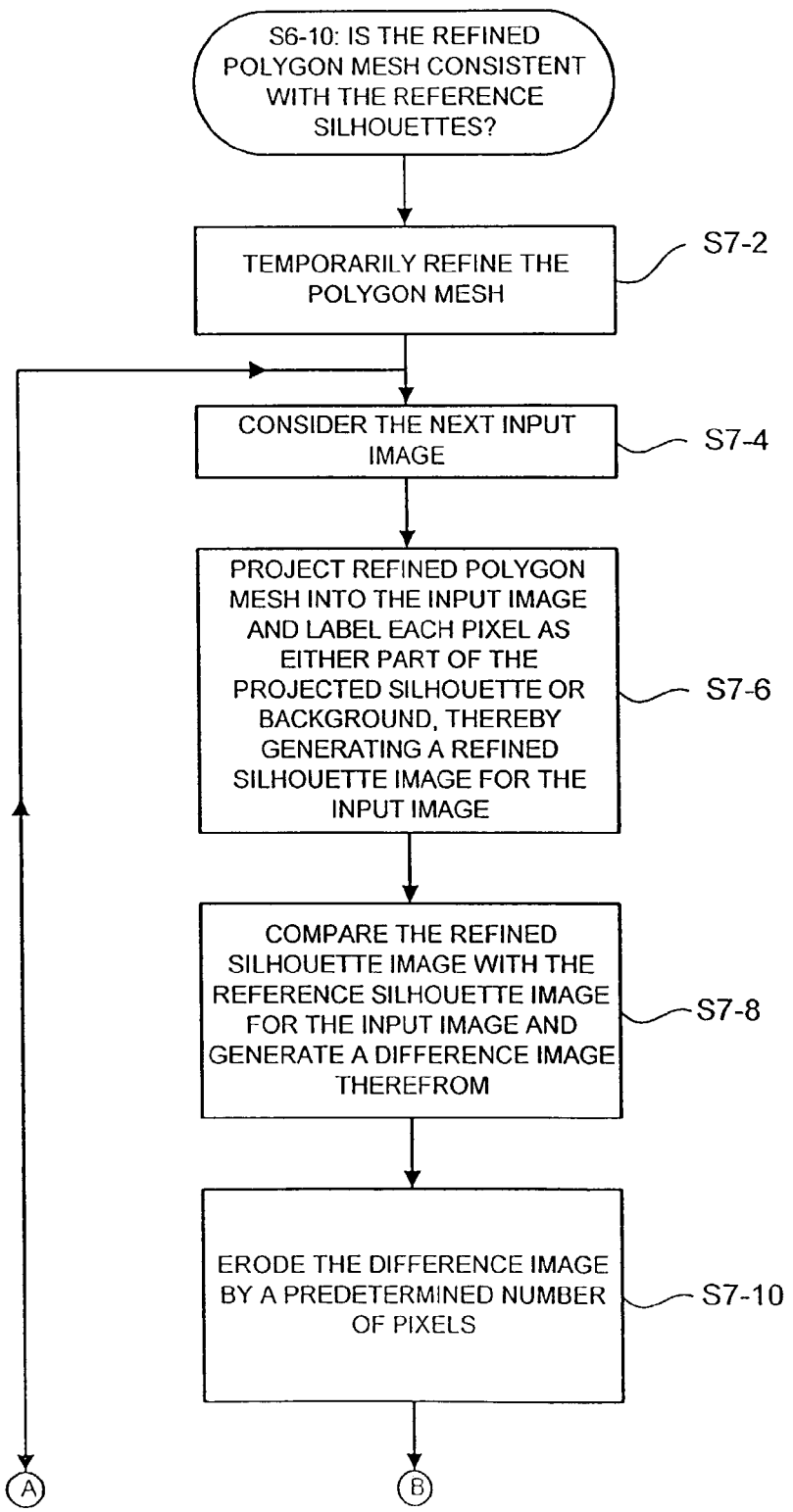
FIGS. 7a and 7b, shows the processing operations performed at step S6-10 in FIG. 6 and step S8-10 in FIG. 8 to determine whether a refined polygon mesh is consistent with reference silhouettes.
Figure 7B:
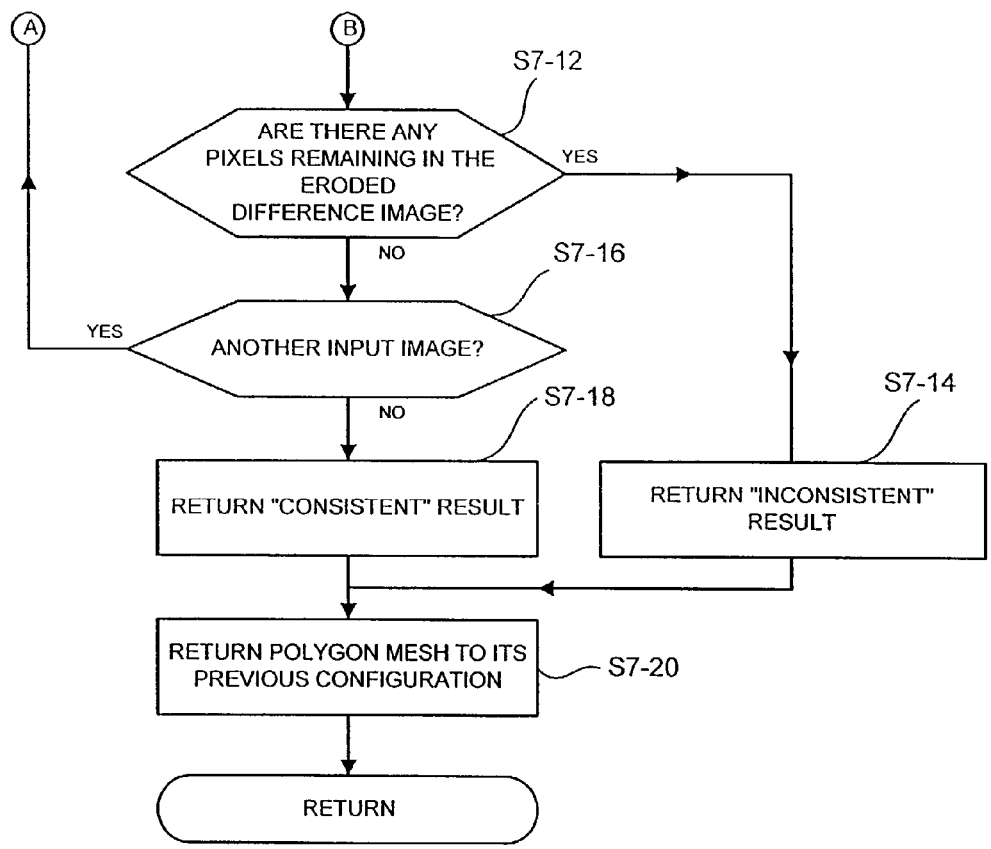

FIG. 7 shows the processing operations performed by mesh refiner 80 at step S6-10.

Referring to FIG. 7, at step S7-2, mesh refiner 80 refines the polygon mesh. In this embodiment, this comprises setting the position of vertex "U" on the candidate edge selected at step S6-6 to the position of vertex "V" (with the effect that the candidate edge is collapsed and therefore removed from the polygon mesh).

At steps S7-4 to S7-18, mesh refiner 80 tests the refined polygon mesh generated at step S7-2 against each reference silhouette previously generated at step S6-2, to determine whether the refined polygon mesh is consistent with all the reference silhouettes.

More particularly, at step S7-4, mesh refiner 80 considers the next input image (this being the first input image the first time step S7-4 is performed).

At step S7-6, mesh refiner 80 projects the refined polygon mesh generated at step S7-2 into the input image selected at step S7-4, and sets the value of each pixel in the input image to 0 or 1 to define whether or not the pixel is part of the projected silhouette (the value 1 indicating that the pixel is part of the silhouette in this embodiment). In this way, a refined silhouette image is generated for the input image defining the silhouette of the refined polygon mesh generated at step S7-2 as seen from the input image (that is, as seen by a camera having the position and orientation of the input image and the imagining parameters defined in the input data stored at step S2-4). As in step S6-2, the pixel values defining the scene in the input images 200–270 stored at step S2-4 are of no relevance to the processing at step S7-6, and can therefore be discarded before step S7-6 is performed (by setting all of the pixels to 0 or 1 in each input image).

At step S7-8, mesh refiner 80 compares the refined silhouette image generated at step S7-6 with the reference silhouette image previously generated at step S6-2 for the same input image. More particularly, in this embodiment, mesh refiner 80 compares the refined silhouette image and the reference silhouette image on a pixel-by-pixel basis to generate a difference image. When carrying out a comparison of a pixel from the refined silhouette image with a pixel from the reference silhouette image, mesh refiner 80 sets the value of the corresponding pixel in the difference image to 0 if the pixel in the refined silhouette image and the corresponding pixel in the reference silhouette image have the same value—that is, if both pixels have the value 0 indicating that they are not part of the refined silhouette or the reference silhouette, or if both pixels have the value 1 indicating that they are part of the refined silhouette and reference silhouette. On the other hand, mesh refiner 80 sets the value of the pixel in the difference image to 1 if the value of the pixel in the reference silhouette image has a different value to the corresponding pixel in the refined silhouette image. In this way, pixels in the difference image are set to the value 1 at every position where the refined silhouette and reference silhouette do not overlap. Consequently, pixel values of 1 in the difference image define positions where the refined silhouette is inconsistent with the reference silhouette.

As will now be described, in this embodiment, based on the number of pixels in the difference image having the value 1, mesh refiner 80 determines whether the refined silhouette is inconsistent with the reference silhouette (with the consequence that the edge collapse made at step S7-2 should not be made in the final 3D computer model if the silhouettes are inconsistent).

More particularly, at step S7-10, mesh refiner 80 erodes the pixels having the value 1 in the difference image generated at step S7-8 by a predetermined number of pixels. In this embodiment, mesh refiner 80 erodes the difference image by three pixels, and the erosion processing is carried out in a conventional manner, for example as described in Digital Image Processing, Second Edition, by Pratt, ISBN 0-471-85766-1, page 457.

At step S7-12, mesh refiner 80 determines whether there are any pixels of value 1 remaining in the difference image after the erosion processing at step S7-10 has been carried out.

If it is determined at step S7-12 that there is at least one pixel of value 1 remaining in the eroded difference image, then at step S7-14, mesh refiner 80 returns an "inconsistent" result, indicating that the refinement to the polygon mesh by collapsing the candidate edge at step S7-2 has resulted in the polygon mesh becoming inconsistent with a reference silhouette.

On the other hand, if it is determined at step S7-12 that there are no pixels of value 1 remaining in the eroded difference image, then mesh refiner 80 determines that the refined polygon mesh generated at step S7-2 is consistent with the reference silhouette for the input image currently being considered, and processing proceeds to step S7-16 to consider further input images.

It will thus be understood that, by performing the erosion processing at step S7-10 and counting at step S7-12 the number of pixels of value 1 in the eroded image, instead of counting the number of pixels of value 1 in the difference image itself generated at step S7-8, small, inconsequential differences between the refined silhouette and the reference silhouette are disregarded, increasing the accuracy and reliability of the refinement processing.

At step S7-16, mesh refiner 80 determines whether there is another input image to be processed. Steps S7-4 to S7-16 are repeated until each input image has been processed in the way described above.

In this way, the refined polygon mesh generated at S7-2 is tested against the reference silhouette for each input image.

When it is determined at step S7-16 that the refined polygon mesh has been tested against all of the input images, processing proceeds to step S7-18, at which mesh refiner 80 returns a "consistent" result indicating that the refinement made to the polygon mesh at step S7-2 by collapsing the candidate edge is consistent with all of the reference silhouettes.

Following the processing at step S7-18, or S7-14, mesh refiner 80 performs processing at step S7-20 to return the polygon mesh to the configuration it had before step S7-2 was performed. Accordingly, in this embodiment, mesh refiner 80 returns the vertex U (which was temporarily moved at step S7-2) to its original position.

Referring again to FIG. 6, if an "inconsistent" result is returned at step S7-14 when step S6-10 is performed, then processing proceeds to step S6-12, at which mesh refiner 80 sets the collapse cost score associated with the candidate edge selected at step S6-6 to a predetermined value which is larger than the threshold value used in the test at step S6-8. In this way, if the candidate edge is subsequently selected again at step S6-6, processing will not proceed from step S6-8 to step S6-10 to test again whether the edge can be removed from the polygon mesh. Instead, the refinement processing will end because it will be determined at step S6-8 that the collapse cost score is greater than the predetermined threshold.

Following step S6-12, at step S6-14, mesh refiner 80 sets an "invalid" flag for the candidate edge. The purpose of this flag will be explained below.

Referring again to step S6-10, if a "consistent" result is returned at step S7-18, then processing proceeds to step S6-16, at which the candidate edge selected at step S6-6 is collapsed within the polygon mesh. In this embodiment, the edge collapse is carried out in a conventional way, for example as described in the article "A Simple Fast and Effective Polygon Reduction Algorithm" published at pages 44–49 of the November 1998 issue of Game Developer Magazine (publisher CMP Media, Inc) or as described in "Progressive Meshes" by Hoppe, Proceedings SIGGRAPH 96, pages 99–108, and results in the removal of two triangular polygons, one edge and one vertex from the polygon mesh. The effect of the processing at step S6-10 on the shape of the polygon mesh is the same as the effect of the processing at step S7-2, which was subsequently tested for consistency with the reference silhouettes at steps S7-18. However, the processing performed at step S6-10 includes "housekeeping" functions to reduce the number of triangles etc in the polygon mesh as a result of the edge collapse, thereby reducing the amount of data defining the polygon mesh.

Following step S6-16, at step S6-18, mesh refiner 80 reads the edge flags associated with the edges remaining in the polygon mesh to determine if any have been set to "invalid" at step S6-14, and performs processing to update the collapse cost scores for the edges remaining in the polygon mesh.

More particularly, in this embodiment, mesh refiner 80 updates the cost scores in accordance with the conventional decimation algorithm used at step S6-4, but ensures that the collapse cost score for each edge having an "invalid" flag (set at step S6-14) remains above the predetermined threshold used in the test at step S6-8.

Steps S6-6 to S6-18 are repeated to select edges in the polygon mesh and test them to determine whether they can be removed, until it is determined at step S6-8 that every edge remaining in the polygon mesh has a collapse cost score greater than the predetermined threshold. When this situation is reached, the removal of any edge in the polygon mesh would cause the mesh to be inconsistent with at least one reference silhouette generated at step S6-2, and accordingly the refinement processing ends.

Referring again to FIG. 2, at step S2-12, central controller 20 outputs the data defining the 3D computer model of the subject object 300 generated by surface modeller 60 from output data store 100, for example as data stored on a storage device such as disk 112 or as a signal 114. In addition, or instead, central controller 20 causes display processor 90 to display on display device 4 an image of the 3D computer model in accordance with a viewpoint input by a user, for example using a user input device 6.

Second Embodiment

In the first embodiment described above, the processing performed by mesh refiner 80 at step S2-10 to refine the polygon mesh to remove concave and convex artefacts comprises decimation processing to remove edges in the polygon mesh without affecting the resulting polygon mesh's consistency with the silhouettes of the subject object.

However, mesh refiner 80 may be arranged to perform other types of processing at step S2-10 to refine the polygon mesh to remove concave and convex artefacts.

For example, a second embodiment will now be described in which mesh refiner 80 performs processing to smooth the polygon mesh without affecting the resulting mesh's consistency with the silhouettes of the subject object.

The components of the second embodiment and the processing operations performed thereby are the same as those in the first embodiment, with the exception of the processing performed by mesh refiner 80 at step S2-10 in FIG. 2. Accordingly, only the processing performed at step S2-10 will be described below.

Figure 8A:
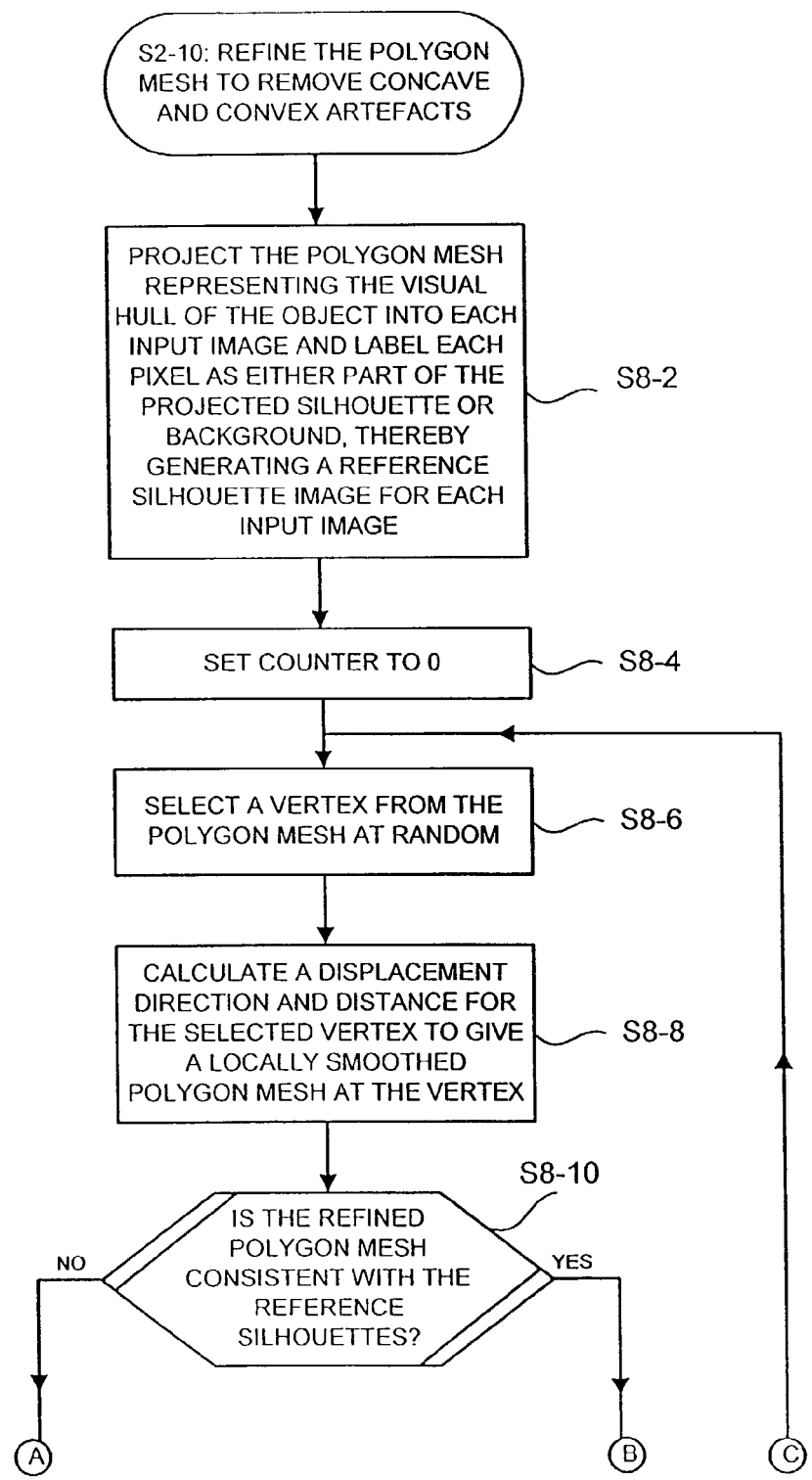
FIGS. 8a and 8b, shows the processing operations performed at step S2-10 in a second embodiment to refine the polygon mesh to remove artefacts.
Figure 8B:
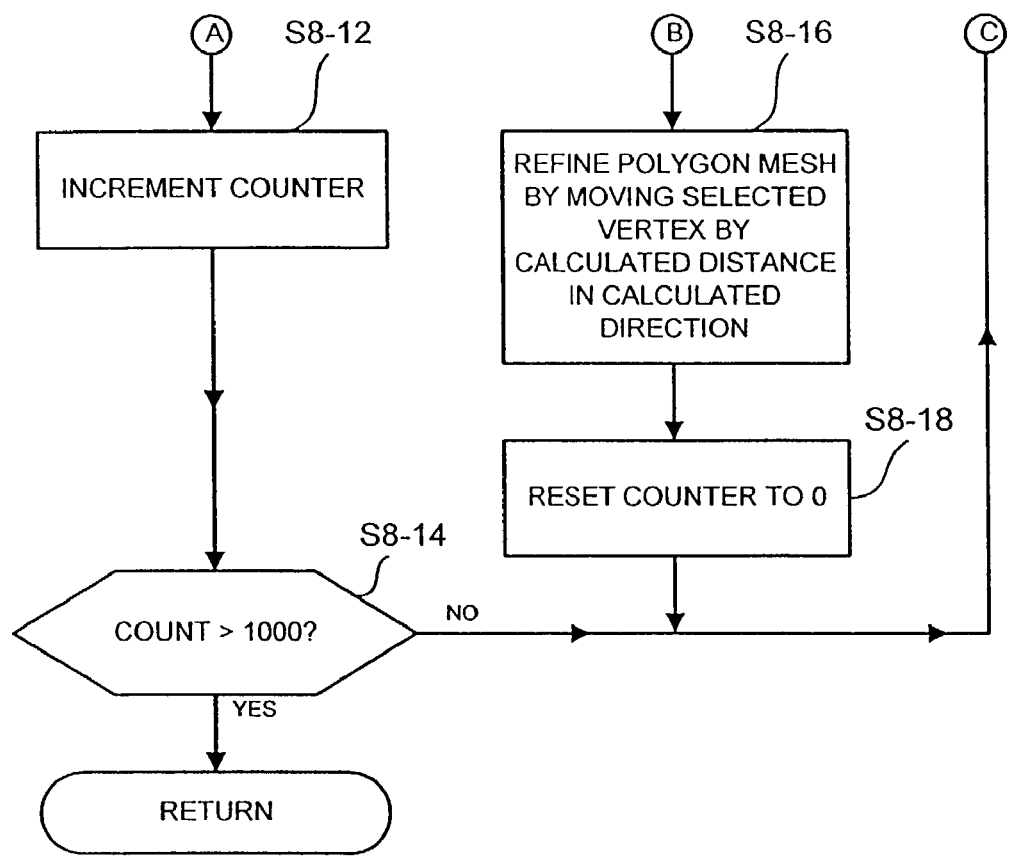

FIG. 8 shows the processing operations performed by mesh refiner 80 at step S2-10 in the second embodiment to refine the polygon mesh generated by wire frame mesh generator 70 at step S2-8 to remove concave and convex artefacts therein.

Referring to FIG. 8, at step S8-2 (which corresponds to step S6-2 in FIG. 6), mesh refiner 80 projects the polygon mesh 500 generated by wire frame mesh generator 70 into each respective input image 200–270.

In addition, in each input image 200–270, mesh refiner 80 sets the value of each pixel to either 0 or 1 to indicate whether or not the pixel is part of the projected polygon mesh (the value 1 indicating in this embodiment that the pixel is part of the projected mesh). In this way, a binary reference silhouette image is generated for each input image 200–270.

At step S8-4, mesh refiner 80 sets the value of a counter to 0.

At steps S8-6 to S8-18, mesh refiner 80 performs processing to test vertices of polygons in the polygon mesh 500 to determine whether the vertices can be moved to smooth the polygon mesh without compromising the consistency of the 3D computer model with the reference silhouettes generated at step S8-2. More particularly, as will be explained below, mesh refiner 80 tests whether a polygon vertex can be moved by temporarily moving the vertex to give an amended polygon mesh, projecting the polygon mesh into each input image to give projected silhouettes, and testing the resulting projected silhouettes against the reference silhouettes generated at step S8-2. If the difference between a projected silhouette and the corresponding reference silhouette is greater than a predetermined threshold, then the polygon vertex is not moved (because the polygon mesh would then be inconsistent with the silhouette data), otherwise the vertex is moved.

In this way, polygon vertices are moved to give a "smoothed" polygon model that is consistent with the silhouette data. Consequently, this results in convex and concave artefacts being removed because, when the polygon vertices defining these artefacts are moved, it is found in the subsequent tests that the resulting polygon mesh is still consistent with the silhouette data. However, small scale features that are apparent in the silhouettes are retained in the polygon mesh and not lost therefrom.

The processing operations performed by mesh refiner 80 at steps S8-6 to S8-18 will now be described in detail.

At step S8-6, mesh refiner 80 selects at random a polygon vertex from the polygon mesh 500.

At step S8-8, mesh refiner 80 calculates a displacement direction and distance for the vertex selected at step S8-6 to give a locally smoothed polygon mesh at the selected vertex. More particularly, in this embodiment, mesh refiner 80 calculates a displacement direction and displacement distance $\underline{d}$ for a selected $\underline{x}_i$ vertex using the following equation:

$$\underline{d} = \frac{c}{m} \sum_{j \in N(i)} \underline{x}_j - \underline{x}_i$$

where $\underline{x}=(x, y, z)$ $\underline{x}_j$ are the neighbours of the selected vertex $\underline{x}_i$ (that is the vertices connected to $\underline{x}_i$ by a single edge in the polygon mesh)

N(i) is the set of neighbour vertices of the selected vertex m is the number of vertices in the set N(i)

c is a constant less than 1 (set to 0.6 in this embodiment)

This displacement is an approximation to the Laplacian operator at the selected vertex, and is referred to in the art as an "umbrella" operator. The umbrella operator is further described in "Implicit Fairing of Irregular Meshes using Diffusion and Curvature Flow" by Desbrun et al in SIGGRAPH99 ACM ISBN 0-201-48560 pages 317–324.

At step S8-10, mesh refiner 80 determines whether the refined polygon mesh resulting from moving the vertex selected at step S8-6 in the direction and distance calculated at step S8-8 is still consistent with the reference silhouettes in the input images (these being the reference silhouettes generated at step S8-2).

The processing operations performed at step S8-10 in the second embodiment by mesh refiner 80 are the same as those performed in the first embodiment at step S6-10, which are described above with reference to FIG. 7.

More particularly, referring again to FIG. 7, at step S7-2, mesh refiner 80 refines the polygon mesh. In the second embodiment, this comprises moving the vertex selected at step S8-6 in the displacement direction calculated at step S8-8 by the displacement distance calculated at step S8-8.

At steps S7-4 to S7-18, mesh refiner 80 tests the refined polygon mesh generated at step S7-2 against each reference silhouette previously generated at step S8-2, to determine whether the refined polygon mesh is consistent with all the reference silhouettes. These processing operations have been described previously in the description of the first embodiment, and accordingly will not be described again here.

At step S7-20, mesh refiner 80 performs processing to return the polygon mesh to the configuration it had before step S7-2 was performed. Accordingly, in this embodiment, mesh refiner 80 returns the vertex selected at step S8-6 (which was temporarily moved at step S7-2) to its previous position.

Referring again to FIG. 8, if an "inconsistent" result is returned at step S7-14 when step S8-10 is performed, then processing proceeds to step S8-12, at which mesh refiner 80 increments the value of the counter previously set to 0 at step S8-4.

At step S8-14, mesh refiner 80 determines whether the value of the counter is now greater than a predetermined value, which, in this embodiment, is set to 1000.

If it is determined at step S8-14 that the value of the counter is greater than 1000, then the refinement of the polygon mesh is complete, and the refinement processing ends. On the other hand, if the counter value is not yet greater than 1000, processing returns to step S8-6 to select another vertex from the polygon mesh at random.

Referring again to step S8-10, if a "consistent" result is returned at step S7-18, then processing proceeds to step S8-16, at which the vertex selected at step S8-6 is moved in the displacement direction calculated at step S8-8 by the distance calculated at step S8-8. In this way, the polygon mesh is refined in a way such that the resulting polygon mesh is still consistent with the reference silhouettes.

Following step S8-16, at step S8-18, mesh refiner 80 resets the value of the counter to 0, and processing returns to step S8-6 to select another vertex from the polygon mesh.

Steps S8-6 to S8-18 are repeated to select vertices from the polygon mesh and test them to determine whether they can be moved, until it is determined at step S8-14 that the value of the counter is greater than 1000. The counter value represents the number of consecutive times that a vertex move has been discarded because the resulting polygon mesh is inconsistent with at least one reference silhouette image generated at step S8-2. Consequently, in this embodiment, refinement processing ceases when 1000 consecutive vertex moves have been determined to be inconsistent with the reference silhouettes (the discarded vertex moves being consecutive because the counter value is reset to 0 at step S8-18 whenever an allowable vertex move is found).

Modifications and Variations

Many modifications and variations can be made to the embodiments described above within the scope of claims.

For example, in the embodiments described above, the input image data comprises "still" images of the subject object 300. However, the input images may comprise frames of image data from a video camera.

In the embodiments described above, at step S2-4, data input by a user defining the intrinsic parameters of the camera is stored. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the embodiments described above, data is input to processing apparatus 2 and stored at step S2-4 defining the positions and orientation of the input images. However, instead, processing apparatus 2 may calculate the positions and orientations of the input images, for example by carrying out processing as described in EP-A-0898245 or WO-A-01/39124.

In the embodiments described above, the reference silhouettes, against which refinements to the polygon mesh are tested, are created at step S6-2 and step S8-2 by projecting the unrefined polygon mesh 500 into each of the input images 200–270 previously used to construct the unrefined polygon mesh 500. However, instead, the reference silhouettes may be generated by projecting the unrefined polygon mesh 500 into only a subset of the input images 200–270, with subsequent refinements to the polygon mesh being tested by projecting the refined mesh into the same subset of images. In addition or instead, the reference silhouettes may be generated by projecting the unrefined polygon mesh 500 into images which are not those stored at step S2-4 and used at steps S2-6 and S2-8 to generate the unrefined polygon mesh 500. More particularly, a plurality of "theoretical" images may be defined, having any position, orientation, size and number of pixels (and which of course do not need to have pixel values to define a scene within the image). Projecting the unrefined polygon mesh 500 into each "theoretical" image gives a set of reference silhouettes against which refinements to the polygon mesh can be tested by projecting the refined polygon mesh into the theoretical images and performing processing as described in the embodiments above. Accordingly, which images are used to generate the reference silhouettes is unimportant.

In the embodiments described above, processing is performed at step S6-2 and step S8-2 to project the un-refined polygon mesh 500 generated by wireframe mesh generator 70 into each image to generate reference silhouettes. Each refinement of the polygon mesh by mesh refiner 80 is then tested to determine whether it is consistent with the reference silhouettes. However, the reference silhouettes need not be generated using the processing at step S6-2 and S8-2. Instead, for example, the silhouettes generated at step S2-6 by segmenting the input image data may be used as the reference silhouettes (although this has been found in practice to reduce the accuracy of the refinements to the polygon mesh).

In the embodiments described above, in order to test whether a refinement made by mesh refiner 80 to the polygon mesh is consistent with each reference silhouette, the entire refined polygon mesh is projected into each image (step S7-6) and the resulting refined silhouette in each image is tested against the entire reference silhouette for the image (step S7-8). However, instead, only the part of the refined polygon mesh containing the refinement made at step S7-2 can be projected into each image and the resulting partial silhouette tested against only part of the reference silhouette for the image. For example, a volume of 3D space containing all of the amendments to the polygon mesh resulting from the refinement at step S7-2, but not the whole of the polygon mesh, may be projected at step S7-6 into the selected input image to give a partial refined silhouette image and also into the corresponding reference silhouette image so that the 2D projection defines a partial reference silhouette image. At step S7-8, the partial refined silhouette and the partial reference silhouette images may then be compared to produce a difference image.

In the embodiments described above, processing is performed at step S7-20 to return a temporarily refined polygon mesh to its previous configuration following tests to determine whether the refined polygon mesh is consistent with the reference silhouettes. Subsequently, at step S6-16 or step S8-16, the amendment to the polygon mesh is re-introduced if the tests indicated that the refined polygon mesh was consistent with the reference silhouettes. Alternatively, however, steps S7-20, S6-16 and S8-16 may be omitted and instead processing may be performed after it is determined at step S6-10 or step S8-10 that the refined polygon mesh is inconsistent with the reference silhouettes, to return the polygon mesh to its previous configuration (that is, the configuration before step S7-2 was performed).

In the embodiments described above, processing apparatus 2 includes image data segmenter 50 and wireframe mesh generator 70 which process the input data stored at step S2-4 to generate a polygon mesh representing the visual hull of the subject object 300 using a shape-from-silhouette technique. However, image data segmenter 50 and wireframe mesh generator 70 may be omitted from processing apparatus 2 and, instead, the data input to processing apparatus 2 and stored at step S2-4 may comprise data defining a polygon mesh representing the visual hull of an object generated using a shape-from-silhouette technique, and data defining the relative positions and orientations of the planes containing the silhouettes from which the visual hull model was generated. Mesh refiner 80 and processing apparatus 2 would then perform processing to refine the input mesh model in the way described above.

In the embodiments described above, processing is performed by a computer using processing routines defined by programming instructions. However, some, or all, of the processing could, of course, be performed using hardware.

The invention claimed is:

1. A method of processing data defining a plurality of images of an object recorded at different positions and orientations and data defining the positions and orientations, to generate data defining a three-dimensional computer model of the object, the method comprising:
    generating a polygon mesh representing the surface of the object, the polygon mesh defining a volume of three-dimensional space constrained by the projection of the respective silhouette of the object from each image into the three-dimensional space; and
    performing refinement processing a plurality of times to attempt to refine the polygon mesh, each time by:
    amending at least one vertex or edge in the polygon mesh to give a refined polygon mesh having an amendment;
    projecting at least part of the refined polygon mesh containing the amendment into a plurality of reference images to give a respective projection silhouette of the refined mesh in each reference image;
    testing the projection silhouette of the refined mesh in each reference image against at least part of a respective reference silhouette in the reference image to determine the differences therebetween; and
    allowing the amendment if the difference between the projection silhouette of the refined mesh and the reference silhouette in each reference image does not exceed a threshold, otherwise rejecting the amendment.

2. A method according to claim 1, further comprising projecting the polygon mesh prior to the refinement processing into each reference image to generate the respective reference silhouette for each reference image.

3. A method according to claim 2, wherein at least some of the reference images comprise images used to generate the polygon mesh.

4. A method according to claim 1, wherein the testing of the projection silhouette of the refined mesh against at least part of a reference silhouette in a reference image comprises:
    comparing the projection silhouette of the refined mesh against the at least part of the reference silhouette on a pixel-by-pixel basis to generate a difference image comprising pixels identifying positions where the projection silhouette and reference silhouette do not overlap;
    performing erosion processing of the difference image; and
    determining the number of pixels identifying positions where the projection silhouette and reference silhouette do not overlap remaining in the difference image after the erosion processing;
    and wherein the amendment is allowed if the number of pixels remaining in the difference image after the erosion processing does not exceed a predetermined number, otherwise the amendment is rejected.

5. A method according to claim 1, wherein the amendment to give a refined polygon mesh comprises collapsing at least one edge in the polygon mesh.

6. A method according to claim 1, wherein the amendment to give a refined polygon mesh comprises moving at least one vertex in the polygon mesh.

7. A method of processing data defining (i) a polygon mesh representing the surface of an object, the polygon mesh defining a volume of three-dimensional space constrained by the projection into the three-dimensional space of a respective silhouette of the object from each of a plurality of images recorded at different positions and orientations and (ii) the positions and orientations at which the images were recorded, to attempt to refine the polygon mesh, the method comprising:
    amending at least one vertex or edge in the polygon mesh to give an amendment changing the polygon mesh;
    projecting at least part of the changed polygon mesh containing the amendment into each of a plurality of reference images to give a respective projection silhouette of the changed mesh in each reference image;
    testing the projection silhouette of the changed mesh in each reference image against at least part of a respective reference silhouette in the reference image to determine the differences therebetween;
    allowing the change to the polygon mesh resulting from the amendment if the difference between the projection silhouette of the changed mesh and the reference silhouette in each reference image does not exceed a threshold, otherwise rejecting the change to the polygon mesh; and repeating the processing a plurality of times.

8. A method according to claim 7, further comprising projecting the polygon mesh prior to the refinement processing into each reference image to generate the respective reference silhouette for each reference image.

9. A method according to claim 8, wherein at least some of the reference images comprise images used to generate the initial polygon mesh.

10. A method according to claim 1 or claim 7, further comprising generating a signal conveying the refined three-dimensional computer model.

11. A method according to claim 10, further comprising making a recording of the signal either directly or indirectly.

12. Apparatus operable to process data defining a plurality of images of an object recorded at different positions and orientations and data defining the positions and orientations, to generate data defining a three-dimensional computer model of the object, the apparatus comprising:
- a polygon mesh generator operable to generate data defining a polygon mesh representing the surface of the object, the polygon mesh defining a volume of three-dimensional space constrained by the projection of the respective silhouette of the object from each image into the three-dimensional space; and
- a polygon mesh refiner operable to perform refinement processing, the polygon mesh refiner comprising:
- a polygon mesh editor operable to amend at least one vertex or edge in the polygon mesh to give a refined polygon mesh having an amendment;
- a polygon mesh projector operable to project at least part of the refined polygon mesh containing the amendment into a plurality of reference images to give a respective projection silhouette of the refined mesh in each reference image;
- a silhouette tester operable to test the projection silhouette of the refined mesh in each reference image against at least part of a respective reference silhouette in the reference image to determine the differences therebetween; and
- an amendment selector arranged to allow the amendment if the difference between the projection silhouette of the refined mesh and the reference silhouette in each reference image does not exceed a threshold, otherwise to reject the amendment.

13. Apparatus according to claim 12, further comprising a reference silhouette generator operable to project the polygon mesh prior to processing by the polygon mesh refiner into each reference image to generate the respective reference silhouette for each reference image.

14. Apparatus according to claim 13, wherein at least some of the reference images comprise images used to generate the polygon mesh.

15. Apparatus according to claim 12, wherein the silhouette tester comprises:
- a difference image generator operable to compare the projection silhouette of the refined mesh against the at least part of the reference silhouette on a pixel-by-pixel basis to generate a difference image comprising pixels identifying positions where the projection silhouette and reference silhouette do not overlap;
- an erosion processor operable to perform erosion processing of the difference image; and
- a pixel counter operable to determine the number of pixels identifying positions where the projection silhouette and reference silhouette do not overlap remaining in the difference image after the erosion processing;

and wherein the amendment selector is arranged to allow the amendment if the number of pixels remaining in the difference image after the erosion processing does not exceed a predetermined number, otherwise to reject the amendment.

16. Apparatus according to claim 12, wherein the polygon mesh editor is operable to collapse at least one edge in the polygon mesh.

17. Apparatus according to claim 12, wherein the polygram mesh editor is operable to move at least one vertex in the polygon mesh.

18. Apparatus operable to process data defining (i) a polygon mesh representing the surface of an object, the polygon mesh defining a volume of three-dimensional space constrained by the projection into the three-dimensional space of a respective silhouette of the object from each of a plurality of images recorded at different positions and orientations and (ii) the positions and orientations at which the images were recorded, to attempt to refine the polygon mesh, the apparatus comprising:
- a polygon mesh editor operable to amend at least one vertex or edge in the polygon mesh to give an amendment changing the polygon mesh;
- a projection silhouette generator operable to project at least part of the changed polygon mesh containing the amendment into each of a plurality of reference images to give a respective projection silhouette of the changed mesh in each reference image;
- a difference calculator operable to test the projection silhouette of the changed mesh in each reference image against at least part of a respective reference silhouette in the reference image to determine the differences therebetween; and
- an amendment selector arranged to allow the change to the polygon mesh resulting from the amendment if the difference between the projection silhouette of the changed mesh and the reference silhouette in each reference image does not exceed a threshold, otherwise to reject the change to the polygon mesh.

19. Apparatus according to claim 18, further comprising a reference silhouette generator operable to project the polygon mesh into each reference image to generate the respective reference silhouette for each reference image.

20. Apparatus according to claim 19, wherein at least some of the reference images comprise images used to generate the initial polygon mesh.

21. Apparatus for processing data defining a plurality of images of an object recorded at different positions and orientations and data defining the positions and orientations, to generate data defining a three-dimensional computer model of the object, the apparatus comprising:
- means for generating data defining a polygon mesh representing the surface of the object, the polygon mesh defining a volume of three-dimensional space constrained by the projection of the respective silhouette of the object from each image into the three-dimensional space; and
- means for performing refinement processing, comprising:
- means for amending at least one vertex or edge in the polygon mesh to give a refined polygon mesh having an amendment;
- means for projecting at least part of the refined polygon mesh containing the amendment into a plurality of reference images to give a respective projection silhouette of the refined mesh in each reference image;

means for testing the projection silhouette of the refined mesh in each reference image against at least part of a respective reference silhouette in the reference image to determine the differences therebetween; and amendment selection means arranged to allow the amendment if the difference between the projection silhouette of the refined mesh and the reference silhouette in each reference image does not exceed a threshold, otherwise to reject the amendment.

22. Apparatus for processing data defining (i) a polygon mesh representing the surface of an object, the polygon mesh defining a volume of three-dimensional space constrained by the projection into the three-dimensional space of a respective silhouette of the object from each of a plurality of images recorded at different positions and orientations and (ii) the positions and orientations at which the images were recorded, to attempt to refine the polygon mesh, the apparatus comprising:

means for amending at least one vertex or edge in the polygon mesh to give an amendment changing the polygon mesh;

means for projecting at least part of the changed polygon mesh containing the amendment into each of a plurality of reference images to give a respective projection silhouette of the changed mesh in each reference image;

means for testing the projection silhouette of the changed mesh in each reference image against at least part of a respective reference silhouette in the reference image to determine the differences therebetween; and amendment selection means arranged to allow the change to the polygon mesh resulting from the amendment if the difference between the projection silhouette of the changed mesh and the reference silhouette in each reference image does not exceed a threshold, otherwise to reject the change to the polygon mesh.

23. A method of processing data defining a plurality of images of an object recorded at different positions and orientations and data defining the positions and orientations, to generate data defining a three-dimensional computer model of the object, the method comprising:

generating a polygon mesh representing the surface of the object, the polygon mesh defining a volume of three-dimensional space constrained by the projection of the respective silhouette of the object from each image into the three-dimensional space; and performing refinement processing a plurality of times, each time by:

amending at least one vertex or edge in the polygon mesh to give a refined polygon mesh having an amendment;

projecting at least part of the refined polygon mesh containing the amendment into a plurality of reference images to give a respective projection silhouette of the refined mesh in each reference image;

testing the projection silhouette of the refined mesh in each reference image against at least part of a respective reference silhouette in the reference image to determine the differences therebetween; and determining amendments for the polygon mesh in dependence upon the differences between the projection silhouette of the refined mesh and the reference silhouette in each reference image.

24. A method of processing data defining (i) a polygon mesh representing the surface of an object, the polygon mesh defining a volume of three-dimensional space constrained by the projection into the three-dimensional space of a respective silhouette of the object from each of a plurality of images recorded at different positions and orientations and (ii) the positions and orientations at which the images were recorded, to change the polygon mesh, the method comprising:

amending at least one vertex or edge in the polygon mesh to give an amendment changing the polygon mesh;

projecting at least part of the changed polygon mesh containing the amendment into each of a plurality of reference images to give a respective projection silhouette of the changed mesh in each reference image;

testing the projection silhouette of the changed mesh in each reference image against at least part of a respective reference silhouette in the reference image to determine the differences therebetween;

determining what change to make to the polygon mesh in dependence upon the difference between the projection silhouette of the changed mesh and the reference silhouette in each reference image and making the determined change; and repeating the processing a plurality of times.

25. Apparatus operable to process data defining a plurality of images of an object recorded at different positions and orientations and data defining the positions and orientations, to generate data defining a three-dimensional computer model of the object, the apparatus comprising:

a polygon mesh generator operable to generate data defining a polygon mesh representing the surface of the object, the polygon mesh defining a volume of three-dimensional space constrained by the projection of the respective silhouette of the object from each image into the three-dimensional space; and a polygon mesh refiner operable to perform refinement processing, the polygon mesh refiner comprising:

a polygon mesh editor operable to amend at least one vertex or edge in the polygon mesh to give a refined polygon mesh having an amendment;

a polygon mesh projector operable to project at least part of the refined polygon mesh containing the amendment into a plurality of reference images to give a respective projection silhouette of the refined mesh in each reference image;

a silhouette tester operable to test the projection silhouette of the refined mesh in each reference image against at least part of a respective reference silhouette in the reference image to determine the differences therebetween; and an amendment calculator operable to determine what amendments to make to the polygon mesh in dependence upon the difference between the projection silhouette of the refined mesh and the reference silhouette in each reference image.

26. Apparatus operable to process data defining (i) a polygon mesh representing the surface of an object, the polygon mesh defining a volume of three-dimensional space constrained by the projection into the three-dimensional space of a respective silhouette of the object from each of a plurality of images recorded at different positions and orientations and (ii) the positions and orientations at which the images were recorded, to change the polygon mesh, the apparatus comprising:

a polygon mesh editor operable to amend at least one vertex or edge in the polygon mesh to give an amendment changing the polygon mesh;

a projection silhouette generator operable to project at least part of the changed polygon mesh containing the amendment into each of a plurality of reference images to give a respective projection silhouette of the changed mesh in each reference image;

a difference calculator operable to test the projection silhouette of the changed mesh in each reference image against at least part of a respective reference silhouette in the reference image to determine the differences therebetween; and an amendment calculator operable to determine what amendments to make to the polygon mesh in dependence upon the difference between the projection silhouette of the changed mesh and the reference silhouette in each reference image, and to make the determined amendments to the polygon mesh.

27. Apparatus for processing data defining a plurality of images of an object recorded at different positions and orientations and data defining the positions and orientations, to generate data defining a three-dimensional computer model of the object, the apparatus comprising:

means for generating data defining a polygon mesh representing the surface of the object, the polygon mesh defining a volume of three-dimensional space constrained by the projection of the respective silhouette of the object from each image into the three-dimensional space; and means for performing refinement processing, comprising:

means for amending at least one vertex or edge in the polygon mesh to give a refined polygon mesh having an amendment;

means for projecting at least part of the refined polygon mesh containing the amendment into a plurality of reference images to give a respective projection silhouette of the refined mesh in each reference image;

means for testing the projection silhouette of the refined mesh in each reference image against at least part of a respective reference silhouette in the reference image to determine the differences therebetween; and means for determining what amendments to make to the polygon mesh in dependence upon the difference between the projection silhouette of the refined mesh and the reference silhouette in each reference image.

28. Apparatus for processing data defining (i) a polygon mesh representing the surface of an object, the polygon mesh defining a volume of three-dimensional space constrained by the projection into the three-dimensional space of a respective silhouette of the object from each of a plurality of images recorded at different positions and orientations and (ii) the positions and orientations at which the images were recorded, to change the polygon mesh, the apparatus comprising:

means for amending at least one vertex or edge in the polygon mesh to give an amendment changing the polygon mesh;

means for projecting at least part of the changed polygon mesh containing the amendment into each of a plurality of reference images to give a respective projection silhouette of the changed mesh in each reference image;

means for testing the projection silhouette of the changed mesh in each reference image against at least part of a respective reference silhouette in the reference image to determine the differences therebetween; and amendment selection means for determining what amendments to make to the polygon mesh in dependence upon the difference between the projection silhouette of the changed mesh and the reference silhouette in each reference image, and for making the determined amendments to the polygon mesh.

29. A method of processing data defining a polygon mesh representing the surface of an object to change the polygon mesh, the method comprising:

amending at least one vertex or edge in the polygon mesh to give an amendment changing the polygon mesh;

projecting at least part of the changed polygon mesh containing the amendment into each of a plurality of reference images to give a respective projection silhouette of the changed mesh in each reference image;

testing the projection silhouette of the changed mesh in each reference image against at least part of a respective reference silhouette in the reference image to determine the differences therebetween;

determining what change to make to the polygon mesh in dependence upon the difference between the projection silhouette of the changed mesh and the reference silhouette in each reference image and making the determined change.

30. Apparatus operable to process data defining a polygon mesh representing the surface of an object to change the polygon mesh, the apparatus comprising:

a polygon mesh editor operable to amend at least one vertex or edge in the polygon mesh to give an amendment changing the polygon mesh;

a projection silhouette generator operable to project at least part of the changed polygon mesh containing the amendment into each of a plurality of reference images to give a respective projection silhouette of the changed mesh in each reference image;

a difference calculator operable to test the projection silhouette of the changed mesh in each reference image against at least part of a respective reference silhouette in the reference image to determine the differences therebetween; and an amendment calculator operable to determine what amendments to make to the polygon mesh in dependence upon the difference between the projection silhouette of the changed mesh and the reference silhouette in each reference image, and to make the determined amendments to the polygon mesh.

31. A computer readable medium storing instructions for causing a programmable processing apparatus to become operable to perform a method as set out in any of claims 1, 7, 23, 24 and 29.

* * * * *

UNITED STATES PATENT AND TRADEMARK OFFICE
CERTIFICATE OF CORRECTION

| | |
|---|---|
| PATENT NO. | : 7,079,680 B2 |
| APPLICATION NO. | : 10/255178 |
| DATED | : July 18, 2006 |
| INVENTOR(S) | : Adam Michael Baumberg |

It is certified that error appears in the above-identified patent and that said Letters Patent is hereby corrected as shown below:

ON THE TITLE PAGE [56] REFERENCES CITED:

Other Publications, page 2, "M. Desburn et al." should read --M. Desbrun et al.--.

ON THE TITLE PAGE [75]:

Inventor, "Adam Michael Baumberg, Berkshire (GB)" should read --Adam Michael Baumberg, Bracknell (GB)--.

COLUMN 1:

Line 16, "back project" should read --back-project--; and
Line 18, "appex" should read --apex--.

COLUMN 2:

Line 30, "note" should read --not--.

COLUMN 3:

Line 67, "etc" should read --etc.--.

COLUMN 5:

Line 39, "form" should read --from--.

COLUMN 7:

Line 55, "Simple" should read --Simple,--; and
Line 58, "Inc)" should read --Inc.)--.

COLUMN 10:

Line 23, "S7-2" should read --step S7-2--;
Line 60, "Simple" should read --Simple,--; and
Line 63, "Inc)" should read --Inc.)--.

UNITED STATES PATENT AND TRADEMARK OFFICE
CERTIFICATE OF CORRECTION

PATENT NO. : 7,079,680 B2
APPLICATION NO. : 10/255178
DATED : July 18, 2006
INVENTOR(S) : Adam Michael Baumberg It is certified that error appears in the above-identified patent and that said Letters Patent is hereby corrected as shown below:

<u>COLUMN 11</u>:

Line 6, "etc" should read --etc.--.

<u>COLUMN 14</u>:

Line 3, "claims." should read --the claims.--; and
Line 52, "un-refined" should read --unrefined--.

Signed and Sealed this

First Day of May, 2007

JON W. DUDAS
*Director of the United States Patent and Trademark Office*